(12) United States Patent
Large

(10) Patent No.: US 8,422,840 B2
(45) Date of Patent: Apr. 16, 2013

(54) FLAT-PANEL OPTICAL PROJECTION APPARATUS

(75) Inventor: Timothy Large, Essex (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/447,790

(22) Filed: Apr. 16, 2012

(65) Prior Publication Data

US 2012/0207434 A1     Aug. 16, 2012

Related U.S. Application Data

(63) Continuation of application No. 12/443,270, filed as application No. PCT/GB2007/003696 on Sep. 28, 2007, now Pat. No. 8,160,409.

(30) Foreign Application Priority Data

Sep. 29, 2006    (GB) .................................. 0619266.4

(51) Int. Cl.
    *G02B 6/34*    (2006.01)
(52) U.S. Cl.
    USPC ............... 385/36; 385/43; 385/129; 385/132; 362/610; 362/615; 362/616; 362/617; 362/628; 362/330
(58) Field of Classification Search ........................ None
    See application file for complete search history.

(56) References Cited

U.S. PATENT DOCUMENTS

| | | | |
|---|---|---|---|
| 4,678,267 A * | 7/1987 | Burns et al. ..................... 385/43 |
| 6,483,967 B2 | 11/2002 | Tang et al. | |
| 7,101,048 B2 | 9/2006 | Travis | |
| 8,160,409 B2 * | 4/2012 | Large ............................... 385/36 |
| 2008/0316768 A1 * | 12/2008 | Travis ........................... 362/617 |
| 2010/0091254 A1 | 4/2010 | Travis et al. | |

FOREIGN PATENT DOCUMENTS

| | | |
|---|---|---|
| WO | WO0172037 A1 | 9/2001 |
| WO | WO0243381 A1 | 5/2002 |
| WO | WO0245413 A1 | 6/2002 |
| WO | WO02060187 A1 | 8/2002 |
| WO | WO03013151 A2 | 2/2003 |
| WO | WO2006082444 A2 | 8/2006 |

OTHER PUBLICATIONS

The European Office Action mailed Apr. 7, 2011 for European Patent Application No. 07823957.1, a counterpart foreign application of U.S. Appl. No. 12/443,270.
Office Action for U.S. Appl. 12/444,003, mailed on May 13, 2011, Adrian Travis, "Flat-Panel Optical Projection Apparatus with Reduced Distortion".
Travis, et al., "P-127: Linearity in Flat Panel Wedge Projection". SID 03 Digest, vol. XXXIV, 2003, p. 716.

* cited by examiner

*Primary Examiner* — Uyen Chau N Le
*Assistant Examiner* — Chad Smith
(74) *Attorney, Agent, or Firm* — Zete Law, P.L.L.C.; MacLane C. Key

(57) ABSTRACT

A light guide of the tapered-waveguide type includes an input slab for expanding a projected image between an input end and an output end, and an output slab arranged to receive rays from the said output end, and to emit them at a point on its face that corresponds to the angle at which the ray is received. The input slab and output waveguide are matched so that all rays injected into the input end undergo the same number of reflections before leaving the output surface. With the invention, the input slab is itself tapered slightly towards the output waveguide. This means that input and output waveguides can be made the same length, in the direction of ray travel, and can therefore be folded over each other with no wasted space.

18 Claims, 4 Drawing Sheets

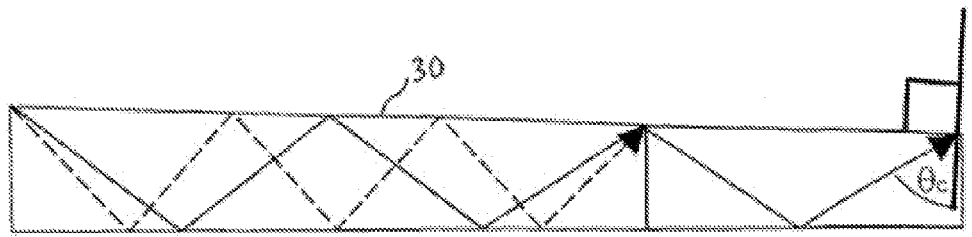
FIG. 7
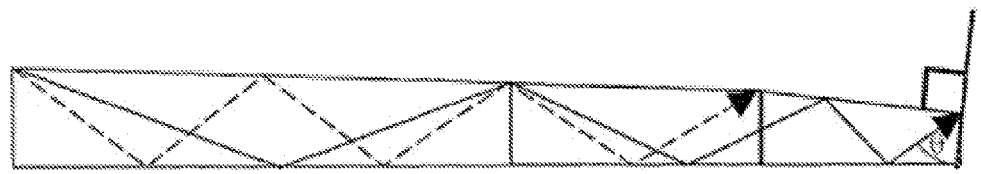
FIG. 8
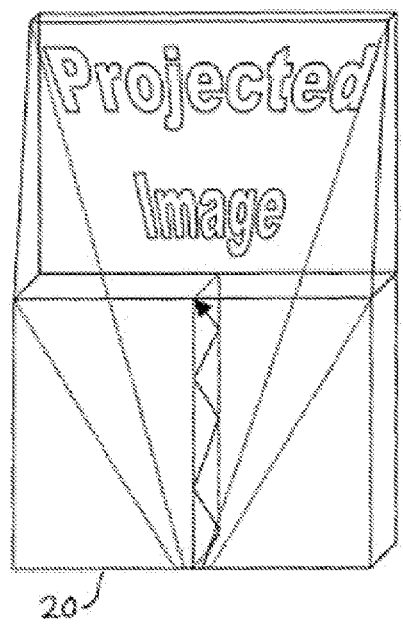 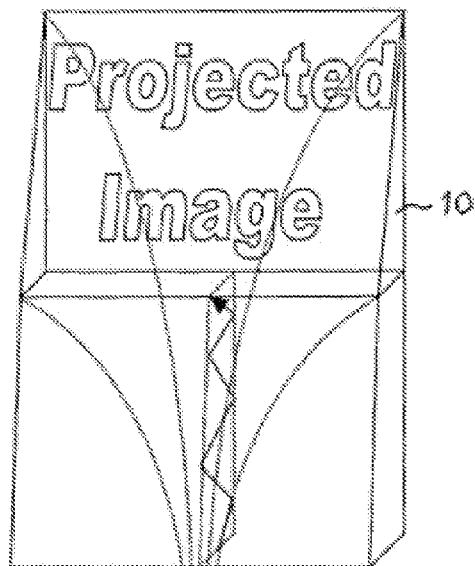
FIG. 9A  FIG. 9B

FLAT-PANEL OPTICAL PROJECTION APPARATUS

CROSS-REFERENCES TO RELATED APPLICATIONS

This application is a continuation of, and claims priority to, U.S. patent application Ser. No. 12/443,270, filed Mar. 27, 2009, which is a National Stage of International Application No. PCT/GB2007/03696, filed on Sep. 28, 2007, which claims priority to Great Britain Patent Application No. 0619266.4, filed on Sep. 29, 2006. All of the above-referenced applications are incorporated by reference herein in their entireties. Any disclaimer that may have occurred during the prosecution of the above-referenced applications is expressly rescinded, and reconsideration of all documents of record is respectfully requested.

BACKGROUND

This invention relates to projection displays and is a way of projecting an image through a light guide with optimal efficiency and minimal margin.

Video projectors produce big moving images at low cost. An inexpensive way of making a television is, as shown in FIG. 1, to point a projector 1 via a mirror 3 onto the rear of a diffusive screen 5. This form of projection television is, however, bulky and users prefer displays to be slim.

A slim projection display can be made according to the applicant's earlier WO 01/72037 by pointing a video projector into the thick end of a tapered light-guide. The principle is illustrated in FIG. 2; the rays entering the thick end 12 of a tapered-panel waveguide 10 via an inclined face bounce at progressively steeper angles until they exceed the critical angle and exit; a shallow ray (solid line) travels further before this happens and therefore exits further along the display (up, in the usual orientation). This is called the tapered-waveguide principle, though it could be brought about by GRIN techniques instead of a purely geometrical taper.

A problem is that, since the projector is much smaller in the lateral dimension than the panel, rays fan out from the point of injection, so the projected image will be V-shaped. Furthermore, the projected image will be broken into bands: each band contains all the rays that undergo a given number of reflections, while the set of rays which have undergone one pair of reflections more or less than rays exiting in adjacent bands will be separated by a gap.

As explained in WO 01/72037, one can insert a transparent input slab of constant thickness between the projector and the tapered light-guide; this means that rays will have the opportunity to fan out before entering the tapered light-guide, so that the projected image becomes trapezoidal.

This is less objectionable than a V-shape but there is still significant keystone distortion. Moreover, viewers like images to fill the screen, so it is desirable to fold the input slab behind the tapered light-guide. This can be done with a pair of right-angled prisms spanning the width of the screen.

A ray entering the input slab at slightly less than the critical angle with respect to its faces undergoes many reflections in the slab but few in the tapered light-guide, whereas a ray entering at much less than the critical angle undergoes few reflections in the slab and many in the tapered light-guide. WO 03/013151 by the applicant explains how to shape the tapered light guide in order that the sum of reflections through the system is the same for rays at all angles of entry, so the projected image is no longer broken into bands. This is shown in FIG. 3, with the parallel-face slab indicated by the numeral 20. This shape of output waveguide is similar to a simple wedge with flat faces, tapering to an edge, whose length is approximately 1.5 times greater than that of the slab. However, one surface of the taper curves outwards slightly so that the thickness of the taper is 10% greater at the half-way point than if the surface were flat.

Projector lenses are less expensive if fan-out angles are small, so it makes sense for the slab to be no shorter than the tapered light-guide, in which case the latter is in effect truncated by a third, as indicated by dashed lines in FIG. 3. The truncated taper which results has a less steep angle of taper than if the light-guide tapered to a point over the same distance. If the angle of taper becomes less steep, then the final angle of intersection made by a ray as it leaves the system is closer to the critical angle and less of the ray is transmitted, which degrades system efficiency. Furthermore, a truncated taper is heavier than one which tapers to a point (edge) from the same starting thickness over the same distance.

While the surfaces of the slab and the tapered light-guide alone have little, if any, curvature, there is a kink at the point where slab meets taper and this degrades the projected image. One can replace this kink with a curve which smoothes the transition from slab to taper, as shown in FIG. 4, but one cannot fold a light-guide whose surfaces are curved. The folding prisms must therefore either be placed between slab and transition region, in which case the transition region becomes an unsightly blank margin beneath the projected image, or the folding prisms must be placed between transition region and wedge, in which case the transition region adds to the length of the slab. If the transition region is long, then the combined length of transition region and slab is such that they extend beyond the length of the wedge in an unsightly manner.

Tapered light-guides can also be used in reverse as explained by WO 02/45413 so that a camera pointed into the thick end captures an image of whatever is placed against the side of the light-guide; here the same problems with the transition region arise.

SUMMARY

It is an object of the invention to improve the space utilisation of optical apparatus using the tapered-waveguide principle.

According to the invention the input slab is itself given a taper, in the same direction as the output waveguide, preferably less than the overall taper of the output waveguide and preferably constant. Again, this need not be a geometrical taper if the effect can be produced by other techniques such as GRIN optics. This in effect shortens the input slab to match the length of the tapered waveguide. The latter can therefore taper almost to a point while remaining, preferably, of the same length in the ray travel direction as the input slab.

BRIEF DESCRIPTION OF THE DRAWINGS

For a better understanding of the invention, embodiments of it will now be described, by way of example, with reference to the accompanying drawings, in which:

FIG. 7 shows the second stage of calculating the tapered light-guide;

FIG. 8 shows the third stage of calculating the tapered light-guide; and

FIGS. 9A and 9B show how a tapered input slab reduces distortion in the projected image.

DETAILED DESCRIPTION

Figure 1:
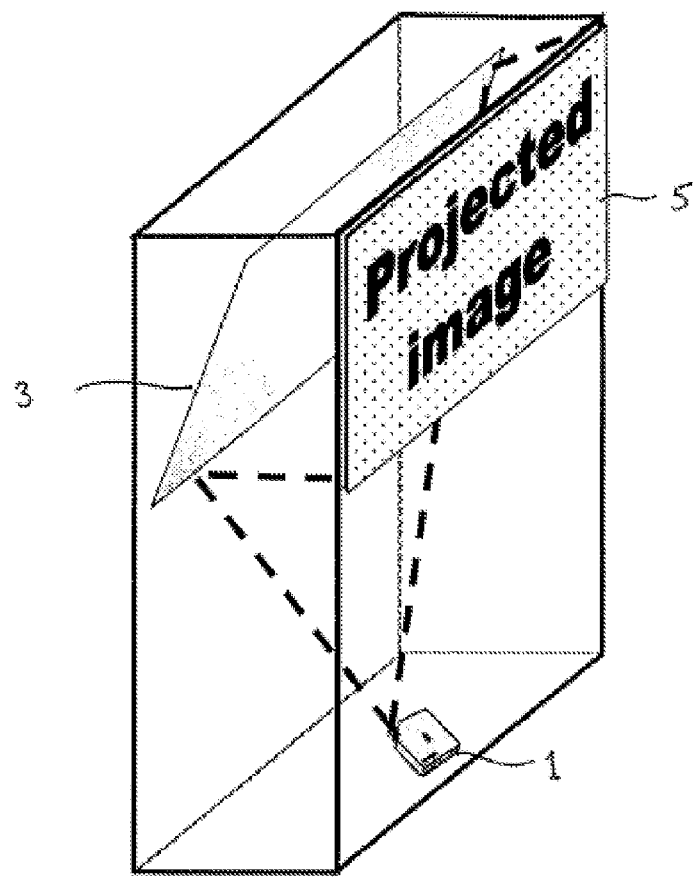
FIG. 1 illustrates a rear-projection television display of known type.
Figure 2:
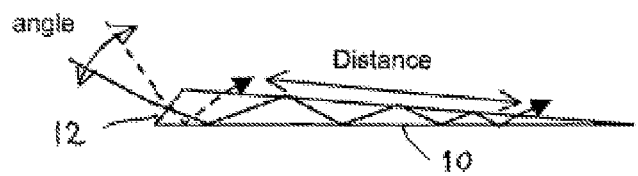
FIG. 2 illustrates the tapered light-guide display principle.
Figure 3:
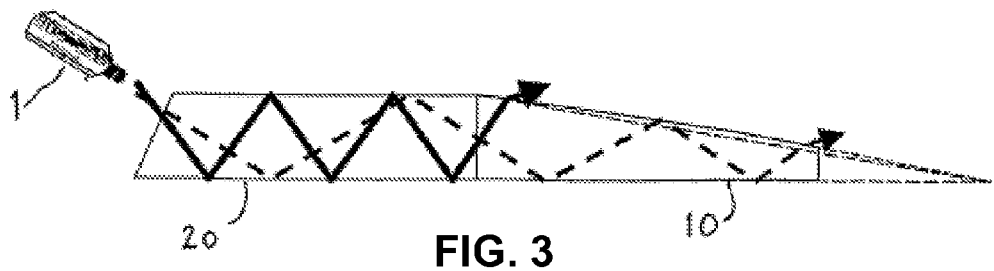
FIG. 3 illustrates the known tapered light-guide display in which all rays undergo the same number of reflections before exit.
Figure 4:
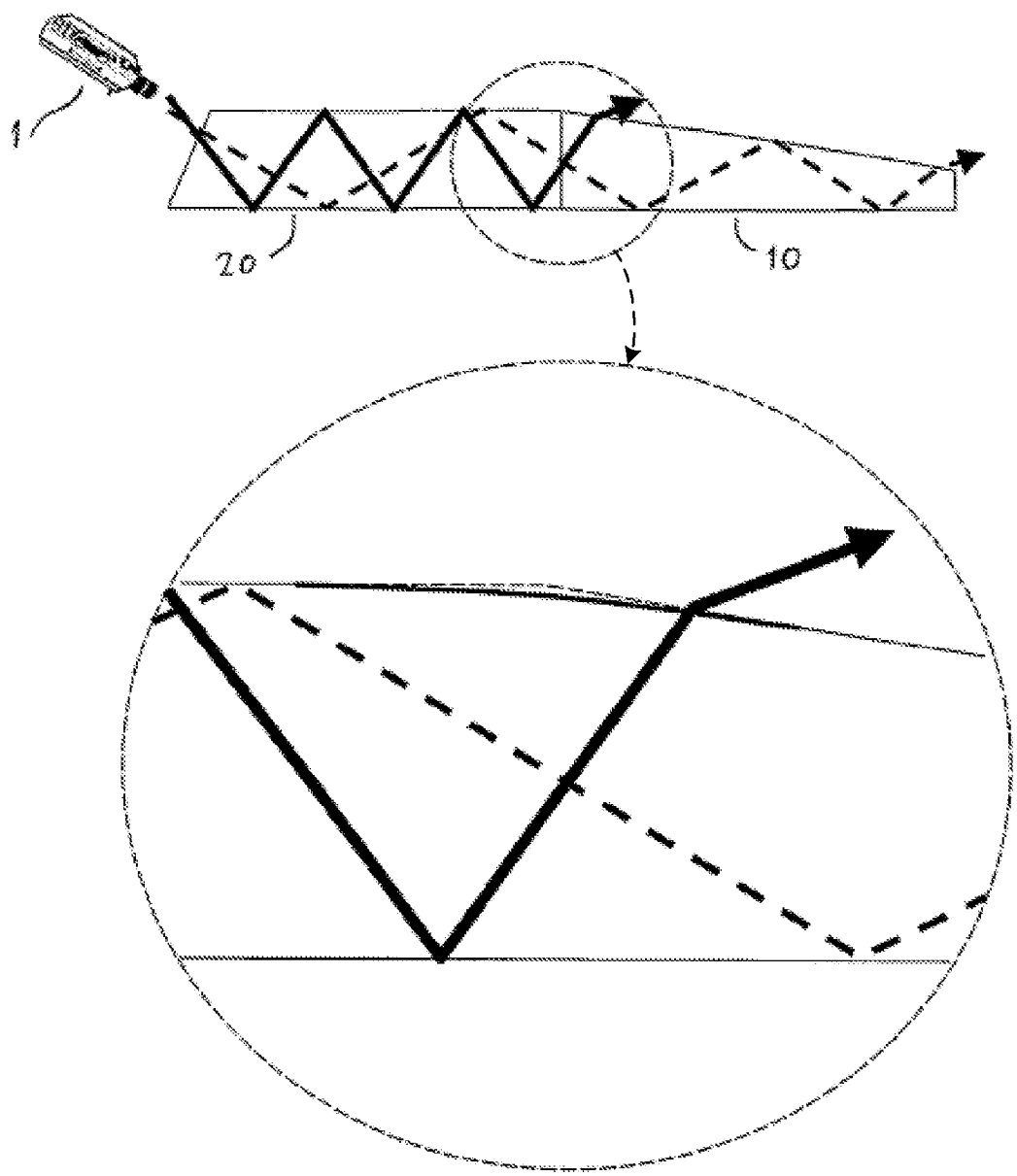
FIG. 4 shows how the kink between slab and taper can be replaced, as is known, with a curved transition.
Figure 5:
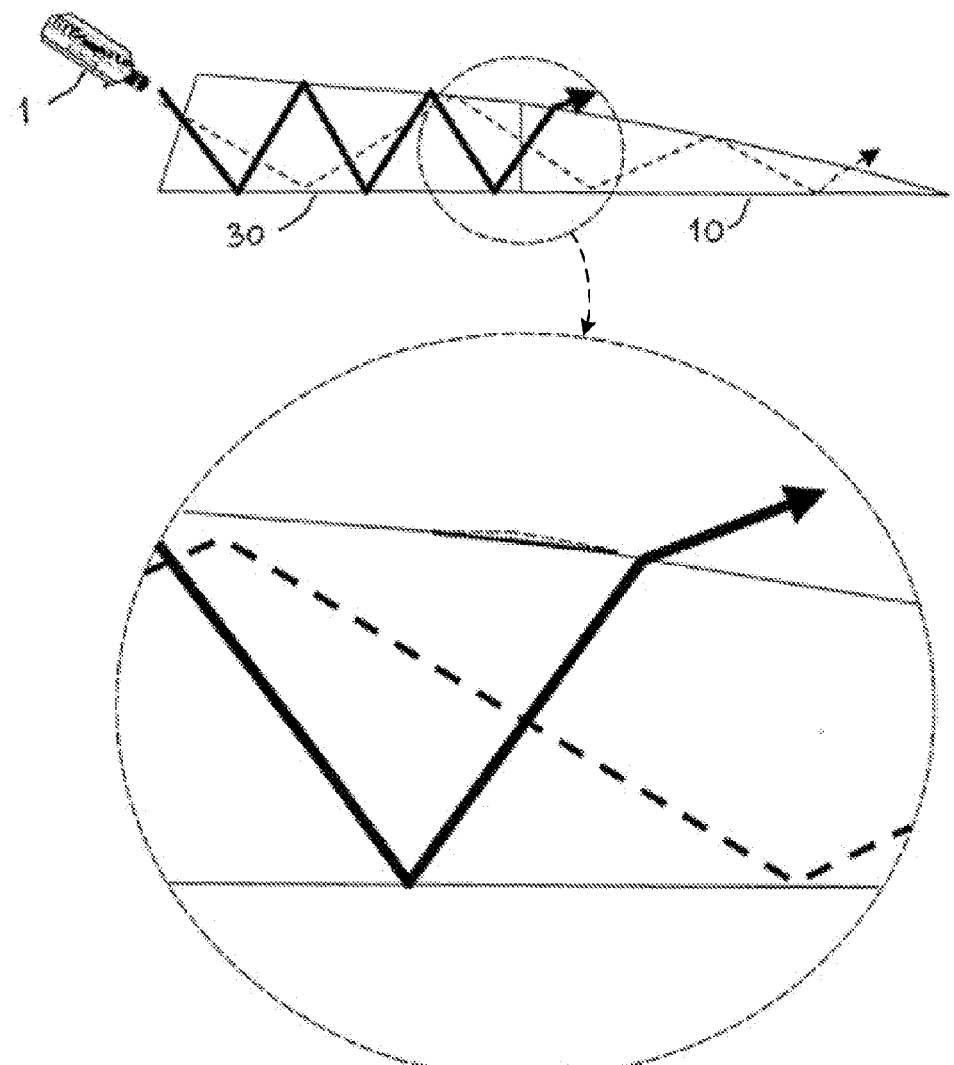
FIG. 5 shows a slab system in accordance with the present invention.

Depicted in FIG. 5 is a projection display including an optical waveguide consisting of input slab 30 and tapered output waveguide 10. These have approximately the same length in the travel direction (left to right for a display, vice versa for a camera). Although not shown, a prism extending for the width of the output waveguide is usually place at the junction so that the input slab is in fact folded behind the output waveguide.

Figure 6:
FIG. 6 shows the first stage of calculating a tapered light-guide through which, when combined with the slab, all rays undergo the same number of reflections before exit.

The input slab 30 is itself slightly tapered. For a given taper of the input slab, a profile can be found for the tapered output slab that ensures that all rays undergo the same number of reflections before exit. This is done in a similar manner to that disclosed in patent WO 03/013151 with a flat input slab. First a ray initially at the critical angle at the output end of the input slab, i.e. the steepest possible propagating ray, with the maximum number of reflections within the input slab, is traced backwards through the slab so as to find the ray's angle at the slab entrance, which is usually an inclined face. The angle of this ray at the slab entrance is then increased, i.e. made shallower, by a small amount, and it is traced forward through the slab to its exit, as shown in FIG. 6. A section of light-guide is then added which is of sufficient length for the ray to undergo the required number of reflections i.e. one more in this case, before exit. In fact, FIG. 6 shows the situation with exactly one fewer reflection. The slope of this added section is adjusted so that, on its final incidence, the ray intersects the new section at an angle just less than the critical angle as shown in FIG. 7.

The angle of the ray at the slab entrance is then increased again by a small amount, the ray is traced through both the slab and the section of light-guide just added, a further section of light-guide of sufficient length for the ray to undergo the required number of reflections is added, and the slope of the newly added section is adjusted so that the ray exits into air on its final incidence, as shown in FIG. 8. The process is repeated until the taper has culminated in a tip.

The angle of slab taper is preferably chosen so that the length of the tapered output light-guide resulting from the iterative process is little greater than that of the slab. For example, if the slab tapers from a thickness of 25 mm to 14 mm over a distance of 450 mm, then the thickness of the tapered light-guide will decrease almost to zero over a distance of 450 mm.

This has four benefits. First, the efficiency is improved because the taper has a steeper angle than before. Secondly, the weight of the system is less because the material removed from the steeper taper greatly outweighs material added on the slab input side, because the latter need be only as wide as the projector. Thirdly, there is less change in angle at the transition from slab to taper, so this region is shortened, which gives less margin at the base of the screen. Fourthly, the system has less keystone distortion.

The reduction in keystone distortion requires further explanation. Rays injected into a slab of constant thickness travel in a straight line apart from the face-to-face reflections, so the fan-out pattern is V-shaped as shown in FIG. 9A. However, rays injected into a tapered slab experience a reduction in forward momentum each time they reflect off one or other of the faces of the slab. The V-shaped pattern turns into one more like a water fountain or Fleur-de-Lys so the rays have fanned out to a greater width by the time they leave the slab, as shown in FIG. 9B. The bottom of the projected image is therefore widened, and key-stone distortion is reduced.

FIGS. 9A and 9B also show how at the input end only a narrow portion of the slab 30 is used, whether or not the slab has the same width as the rest of the apparatus, in particular as the tapered output waveguide representing the screen proper. This reflects the much smaller width of the projector (around 5 cm) than the display as a whole (e.g. 100 cm).

It should be noted that the same principles apply for a tapered light-guide if it is to be used in reverse with a camera in place of the projector. In this case, the term "input slab" is slightly misleading, because it is actually providing the output to the camera. It could be termed a "lateral expansion/contraction slab" instead.

The invention claimed is:

1. A light guide comprising:
an input slab having an input slab input face and a second input slab face; and an output waveguide to receive rays from the input slab, and to emit the rays through an output face, the output waveguide having the output face and a second output waveguide face, wherein a thickness of the input slab tapers at a constant first angle in a direction of ray travel and a thickness of the output waveguide between the output face and the second output waveguide face tapers at a second angle that is different from the first angle, in which the second angle at which the output waveguide taper increases in the direction of wave travel, the input slab being configured so a steepest possible propagating ray entering the input slab through the input slab input face and propagating to the output waveguide reflects off the second input slab face, the output waveguide being configured so a second propagating ray entering the input slab through the input slab input face and propagating to the output waveguide reflects off the second output waveguide face.

2. A light guide according to claim 1, in which the first angle and the second angle are controlled so that rays of different angles travelling between an input end of the input slab and a location where the rays leave the output face undergo a same number of reflections.

3. A light guide according to claim 1, further including a prism arrangement for folding the light guide by 180° so that the input slab and the output waveguide are arranged one on top of another.

4. A light guide according to claim 1, in which:
the input slab and the output waveguide are of substantially a same length; and
the output face tapers at the second angle to coincide with a bottom face of the output waveguide at a distal end of the output waveguide.

5. A light guide according to claim 1, further comprising a projector to inject an image into an input end of the input slab.

6. A light guide according to claim 1, further comprising a camera to receive an image from an input end of the input slab.

7. A light guide according to claim 1, in which the input slab allows a projected image to expand laterally within the input slab as light of the image travels between an input end and an output end.

8. A light guide according to claim 1, in which the constant first angle at which the input slab tapers is less than the second angle at which the output waveguide tapers.

9. A light guide comprising:
an input slab having a first end, a second end, and an input slab face the input slab having a constant angle of taper from the first end to the second end; and an output waveguide to receive light rays from the input slab, and emit the light rays through an output face, the output waveguide having the output face and an output waveguide face, the output waveguide having an angle of taper between the output face and the output waveguide face in a direction of ray travel, the constant angle of taper of the input slab being different than the angle of taper of the output waveguide, in which the angle of taper of the output waveguide increases in the direction of ray travel, the input slab being configured so a steepest possible propagating ray entering the input slab through the first end and propagating to the output waveguide reflects off the input slab face, the output waveguide being configured so a second propagating ray entering the input slab through the first end and propagating to the output waveguide reflects off the output waveguide face.

10. A light guide according to claim 9, in which the constant angle of taper of the input slab and the angle of taper of the output waveguide are controlled so that light rays of different angles travelling between the first end of the input slab and a location where the light rays leave the output face undergo a same number of reflections.

11. A light guide according to claim 9, further including a prism arrangement for folding the light guide by 180° so that the input slab and the output waveguide are arranged one on top of another.

12. A light guide according to claim 9, in which:
the input slab and the output waveguide are of substantially a same length; and
the output face tapers to coincide with a bottom face of the output waveguide at a distal end of the output waveguide.

13. A light guide according to claim 9, further comprising a projector to inject an image into the first end of the input slab.

14. A light guide according to claim 9, in which the constant angle of taper of the input slab is less than the angle of taper of the output waveguide.

15. An apparatus comprising:
an input slab to receive light rays at an input end, the input slab decreasing in thickness from the input end to an output end at a first angle of taper, and having an input slab face;
an output slab having an entrance end to receive the light rays from the output end of the input slab, the output slab having an output face to emit the light rays, the output slab having an output slab face, the output slab decreasing in thickness between the output face and the output slab face from the entrance end at a second angle of taper different from the first angle of taper, the input slab being configured so a steepest possible propagating ray entering the input slab through the input end and propagating to the output slab reflects off the input slab face, the output slab being configured so a second propagating ray entering the input slab through the input end and propagating to the output slab reflects off the output slab face.

16. An apparatus according to claim 15, in which the first angle of taper of the input slab and the second angle of taper of the output slab are selected so that light rays entering the input end of the input slab at different angles reflect a same number of times before exiting the output face.

17. An apparatus according to claim 15, in which a length of the input slab in a direction of light travel is substantially equivalent to a length of the output slab in the direction of light travel.

18. An apparatus according to claim 15, in which the first angle of taper of the input slab is a constant first angle of taper that is less than the second angle of taper of the output slab.

* * * * *